Patented Dec. 15, 1953

2,662,920

UNITED STATES PATENT OFFICE 2,662,920

PROCESS FOR PREPARING 2,3-DIMETHYL-HEPTENE-2-ONE-6

Walter Kimel, Highland Park, N. J., assignor to Hoffmann-La Roche Inc., Roche Park, Nutley, N. J., a corporation of New Jersey No Drawing. Original application June 10, 1952, Serial No. 292,730. Divided and this application November 29, 1952, Serial No. 323,334

2 Claims. (Cl. 260—595)

This invention relates to a novel chemical compound, and to process of preparing and converting said compound. More particularly, the invention is concerned with the new substance 1,1,2 - trimethyl - propen - 2 - yl 3 - oxobutanoate which can be represented by the formula $CH_3COCH_2COO.C(CH_3)_2C(CH_3)=CH_2$. This substance can be prepared by condensing 2,3-dimethyl-buten-3-ol-2 with diketene, and the product can be converted by heating (with loss of carbon dioxide) into 2,3-dimethyl-hepten-2-one-6. The latter can be converted to methylcitral, methyl-geraniol or pseudoirone by known processes, and thus the invention is of interest to the pharmaceutical, perfume and soap industries.

The invention is further disclosed in the following example, which is illustrative but not limitative thereof.

EXAMPLE

In a flask equipped with a stirrer, a thermometer, a dropping funnel, and a drying tube, 0.5 g. of sodium was reacted with 200 g. (2.0 mol) of 2,3-dimethyl-buten-3-ol-2. The solution was cooled to 10° C. and 202 g. (2.4 mols) of diketene was added slowly, with efficient stirring, during five hours, while maintaining the temperature at 10° C. The mixture was then stirred for 24 hours at 10° C.

The resulting dark orange solution was diluted with 200 cc. of toluene and extracted four times with 200 cc. portions of saturated sodium bicarbonate solution, and then washed with water until neutral. The organic solution was dried over calcium sulphate, and concentrated in vacuo. The residue was fractionated under reduced pressure to yield 1,1,2-trimethyl-propen-2-yl 3-oxobutanoate, B. P. (4 mm.) 75°–85° C.; $n_D^{25}=1.4461$.

In a one-liter-3-neck flask, connected to a gas meter through an efficient reflux condenser, and also equipped with a stirrer and thermometer, was placed 276 g. (1.5 mols) of 1,1,2-trimethyl-propen-2-yl 3-oxobutanoate. The flask was heated in an oil bath at 130°–170° C. Evolution of carbon dioxide commenced at about 125° C., and was complete after 3 hours at 140° to 150° C. The product was purified by distillation under reduced pressure, yielding 2,3-dimethyl-hepten-2-one-6; B. P. 74°–77° C. (9 mm.); $n_D^{25}=1.4480$.

This application is a division of my copending application Ser. No. 292,730, filed June 10, 1952.

I claim:

1. A process which comprises condensing diketene with 2,3-dimethyl-buten-3-ol-2 and decarboxylating the condensation product to produce 2,3-dimethyl-hepten-2-one-6.

2. A process of preparing 2,3-dimethyl-hepten-2-one-6 which comprises heating 1,1,2-trimethyl-propen-2-yl 3-oxobutanoate to eliminate carbon dioxide therefrom.

WALTER KIMEL.

References Cited in the file of this patent

FOREIGN PATENTS

| Number | Country | Date |
| --- | --- | --- |
| 646,962 | Great Britain | Nov. 29, 1950 |